(12) United States Patent  
Suess et al.

(10) Patent No.: US 6,966,035 B1  
(45) Date of Patent: Nov. 15, 2005

(54) FRAME FOR COMMUNICATING EXPRESSIVE INFORMATION FOR MEETINGS

(75) Inventors: Carol Sue Hidy Suess, Redmond, WA (US); Nick Valison, Renton, WA (US); Kathleen Vivian Bertagnolli, Bothell, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 716 days.

(21) Appl. No.: 09/955,044

(22) Filed: Sep. 19, 2001

(51) Int. Cl.[7] .............................................. G06F 3/00
(52) U.S. Cl. ...................... 715/753; 751/752; 751/765; 751/781
(58) Field of Search ............................... 715/751, 752, 715/753, 764, 765, 781

(56) References Cited

U.S. PATENT DOCUMENTS

| 5,164,980 A | 11/1992 | Bush, et al. ................. 379/53 |
| 5,365,265 A | 11/1994 | Shibata, et al. ............... 348/15 |
| 5,402,418 A | 3/1995 | Shibata, et al. ............... 370/62 |
| 5,508,718 A * | 4/1996 | Haikin ....................... 345/601 |
| 5,880,731 A * | 3/1999 | Liles et al. .................. 345/758 |
| 6,038,225 A | 3/2000 | Nago ......................... 370/343 |
| 6,522,333 B1 * | 2/2003 | Hatlelid et al. ............. 345/474 |
| 2001/0055036 A1 * | 12/2001 | Burstrom .................... 345/758 |

* cited by examiner

Primary Examiner—Raymond J. Bayerl  
Assistant Examiner—Michael Roswell

(57) ABSTRACT

A murmur frame for a participant to communicate expressive information with other participants in a meeting includes a personal information section that contains a name of the participant, one or more icons indicating inputs and reactions of the participant related to a subject matter or other aspects of the meeting, and one or more annotation banners containing comments or questions of the participant. The input may include pictorial, textual, and audible inputs. The murmur frame is subdivided into sub-areas each dedicated to a specific aspect of the meeting. The choice of a sub-area in which an icon is displayed is significant. The murmur frame containing the expressive information may be transmitted to the other participants through a computer network system to advance communication for the meeting.

19 Claims, 14 Drawing Sheets

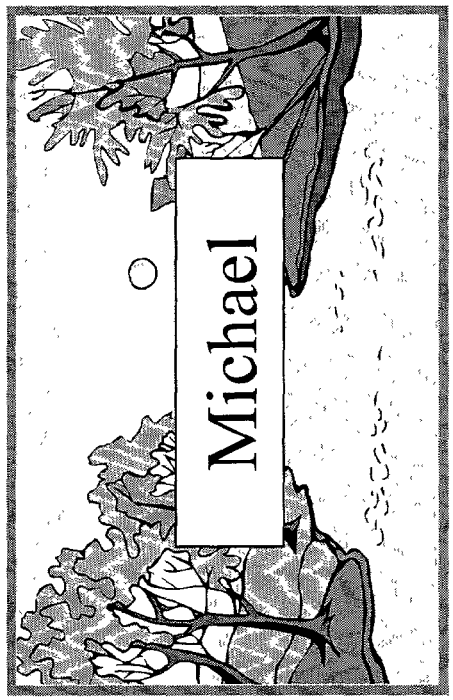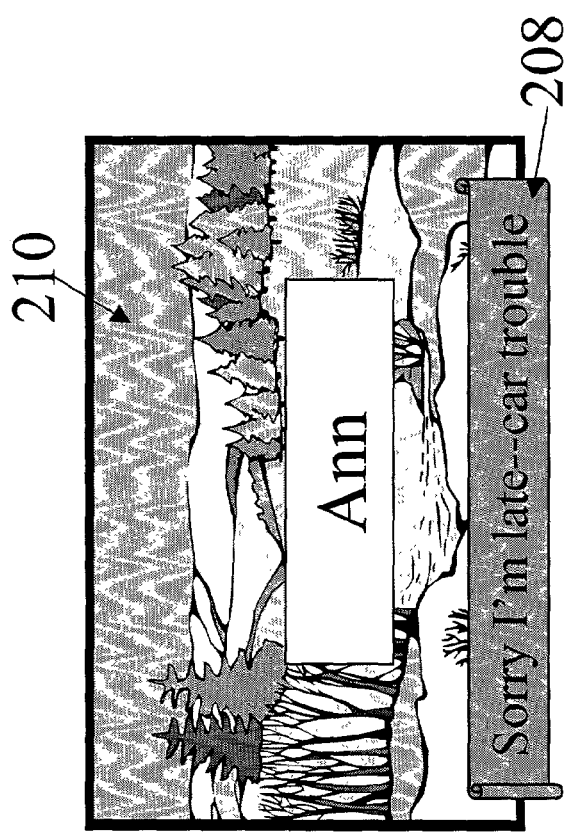
Figure 5

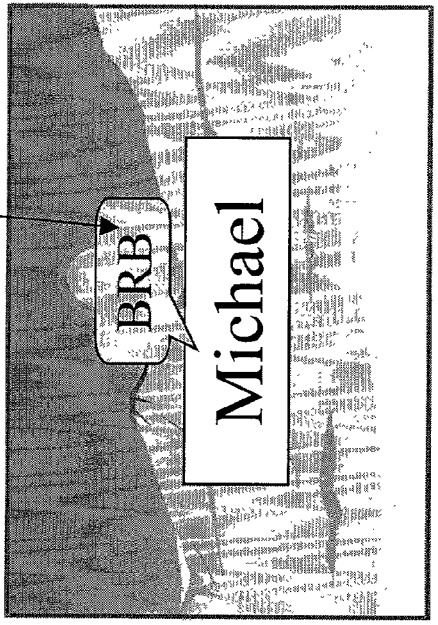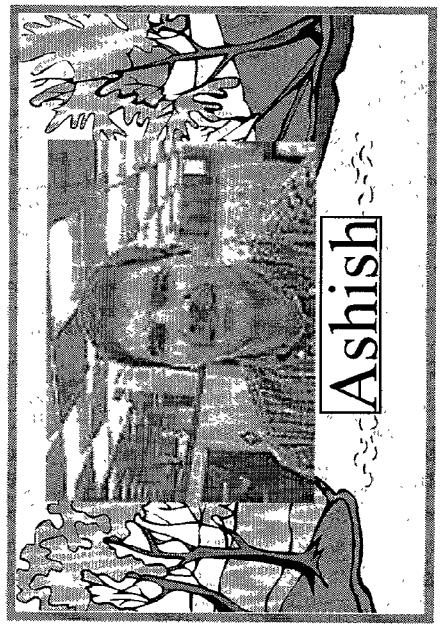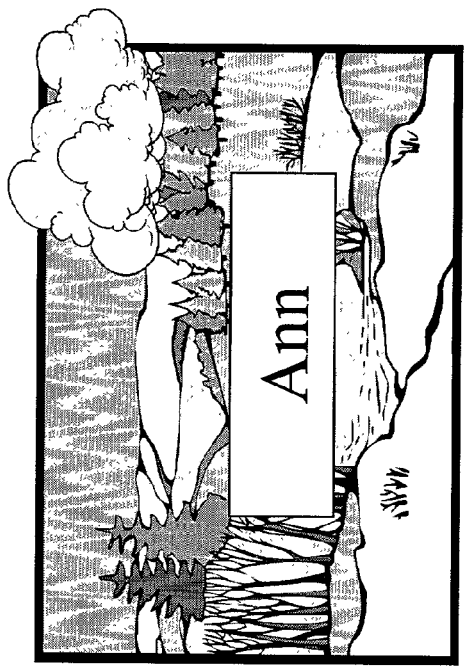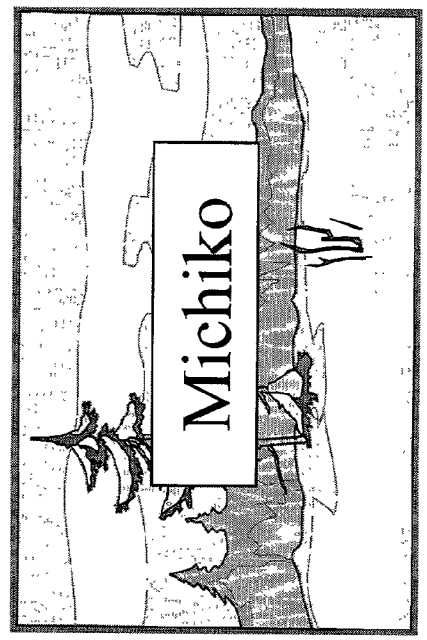
Figure 10

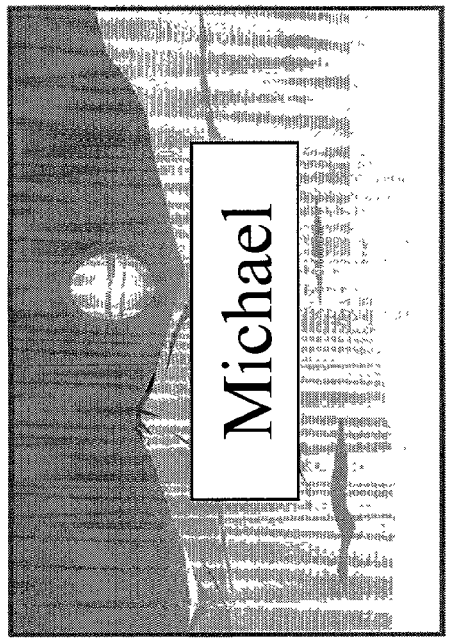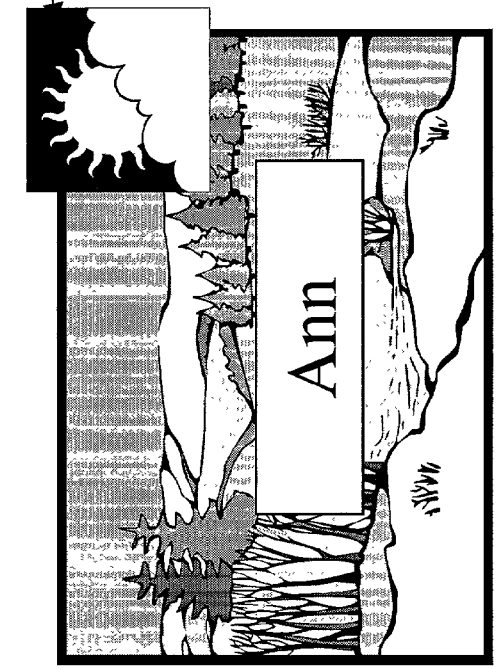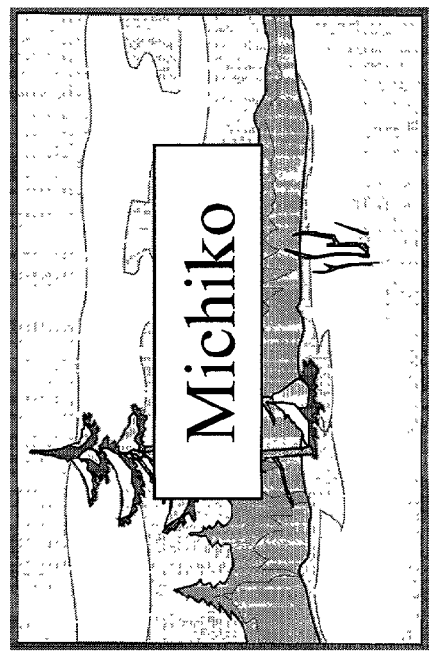
Figure 11

FRAME FOR COMMUNICATING EXPRESSIVE INFORMATION FOR MEETINGS

TECHNICAL FIELD

The technical field relates to communication systems, and, in particular, to a frame for communicating expressive information for meetings.

BACKGROUND

Remote meetings have long been crippled because participants cannot effectively convey or exchange important expressive information with the whole group. During a presentation, very often no one voices confusions or concerns, because each participant, unable to observe similar confusion on other participants' faces, typically thinks that he/she is the only one who has the question. Similarly, a speaker making a presentation typically does not know when to stop explaining, since he/she cannot readily observe reactions on the audience's faces. As a result, important questions and objections are often not raised, and too much time is spent explaining what is already understood.

Similarly, during a cross-cultural group meeting where group members cannot confidently interpret each other's demeanor, participants may feel cut off from the group, while leaders may have trouble controlling meeting pace and leading discussions effectively.

Some existing remote meeting tools enable participants to send verbal or nor-verbal messages to a leader or a moderator of the meeting. However, the messages are typically available only to the leader or the moderator, and other participants cannot use the messages to gauge the flow and tenor of the meeting. Accordingly, the participants typically cannot directly contribute to the group's dynamics as they would in a face-to-face meeting.

Some other existing remote meeting tools enable participants to communicate very limited expressive information. For example, participants may be able to show degrees of enthusiasm on a sliding scale through a handheld device, or sign up on a list indicating a desire to speak. However, the indications are often ambiguous. For example, a participant who expresses an intention to speak typically does not indicate whether the desire is to ask a question or to comment.

Remote meeting participants sometimes use text chat to augment telephone conferencing. However, two important limitations relate to the text chat. First, in many cases the text chat does not embrace the entire group, but serves as a sidebar conversation among a subset of the participants. Thus, the text chat serves more to fragment the meeting than to contribute to the overall dynamic of the group as a whole. Second, the text chat tends to be keyboard-intensive, requiring the same kind of attention and mental processing as the meeting's main discussion. Therefore, the text chat often competes with the main discussion of the meeting for the participants' mind share. When feelings run high or a topic under discussion calls for concentration, the participants generally abandon the text chat, or abandon the main discussion and simply vent feelings in the text chat. Third, as participation increases, the speed with which information in a chat window scrolls up and off the page increases, i.e., the more people contribute, the faster the contributions disappear, and the harder for the participants to follow the text chat. Accordingly, while a text chat window may be adequate for communicating reactions of a few participants among themselves, the text chat is inadequate for communicating expressive information among a large group of participants.

Remote meeting participants have also tried to use video transmission as a medium for expressing and exchanging reactions. However, video cameras do not provide feedback effectively because expressive information is typically communicated through body language and gestures. Even if network bandwidth and computer power are able to accommodate multiple video transmission, trying to watch an array of video windows proves to be inadequate. Meeting participants, unlike professional actors following a script, tend to focus on the subject of the meeting and the meeting itself, not on conveying a specific message through a camera. Accordingly, the nuances of body language that depend on physical proximity and eye contact simply cannot be conveyed through independent videos. In addition, trying to follow multiple video screens may be distracting and tiresome for participants.

Emote icons such as ☺ and ☹ have become common ways to communicate participant reactions in text interchanges, and many instant messaging products have "improved" the emote icons with color and other graphic detail. However, the improved versions of the emote icons typically lose clarity and readability. Additionally, the range of expression in emote icons is limited and the means for delivery (e.g., text chat) has the drawbacks described above.

SUMMARY

A murmur frame for a participant to communicate expressive information with other participants in a meeting includes a personal information section that contains a name of the participant, one or more icons indicating inputs and reactions of the participant related to a subject matter or other aspects of the meeting, and one or more annotation banners containing comments or questions of the participant. The input may include pictorial, textual, and audible inputs. The murmur frame containing the expressive information may be transmitted to the other participants through a computer network system to advance communication for the meeting.

An embodiment of the personal information section of the murmur frame contains a still or video picture of the participant. Another embodiment of the murmur frame includes audible inputs from the participants. Yet another embodiment of the murmur frame is color coded to represent different expressive information. Still another embodiment of the murmur frame includes predefined standard annotations that can be selected from a menu and are configurable.

The murmur frame achieves greater team effectiveness by allowing meeting participants to express reactions and insights and to observe other participants' reactions and insights. Expressive information may be communicated to the entire group without interrupting the main discussion of the meeting by any of the participants. Thus, speakers, moderators, and participants may all rely on expressive information from all members participants for guidance in working effectively with the group's continually-unfolding dynamics.

DESCRIPTION OF THE DRAWINGS

The preferred embodiments of a murmur frame for communicating expressive information for meetings will be described in detail with reference to the following figures, in which like numerals refer to like elements, and wherein:

FIGS. 3–14 illustrate an exemplary meeting using the exemplary murmur of FIG. 1 and the exemplary murmur frame of FIG. 2.

DETAILED DESCRIPTION

A murmur is a software that enables remote and local participants in a meeting to provide the entire group with ongoing personal expressive information relevant to the group's dynamics, i.e., murmur information. The murmur enables greater team effectiveness by allowing meeting participants to express reactions and insights and to observe and correctly interpret other participants' reactions and insights.

Murmur information is traditionally provided by the participants' expressions, stance, actions, and verbal asides in face-to-face interactions. Murmur information may include some or all of the following: each participant's reactions to a subject matter of a discussion; status in relation to a meeting, such as waiting to ask a question or briefly called away; thoughts; intentions; and other relevant activities. Murmur information may be communicated to the entire group without interrupting the main threads of the meeting by any of the participants. Speakers, moderators, and participants may all rely on murmur information for guidance in working effectively with the group's continually-unfolding dynamics.

The murmur may be implemented in a variety of ways to leverage features of various electronic compilers and appliances. For example, the murmur may be implemented by a computer network system that includes murmur frames, i.e., frames. Alternatively, the murmur may be implemented by a computer network system that includes a figure for each participant. The figure's posture may serve as one icon area, whereas each hand, feet, or mouth may hold other icons or text banners. In addition, one or more audio "frames" may be included, with, for example, sound effects, background music, or various kinds of ambient noise, as long as the noises do not interrupt the main thread of the meeting and are clearly associated with the participant who triggers them. Additionally, appropriate audio separation may be provided to distinguish such an audio frame from the main audio discussion (for example, through the use of surround-sound that allows the audio frame to be assigned an audio "location" unmistakably distinct from the main discussion), so that the participants may appropriately use the audio frame for low-volume muttered (literally "murmured") comments.

Figure 1:
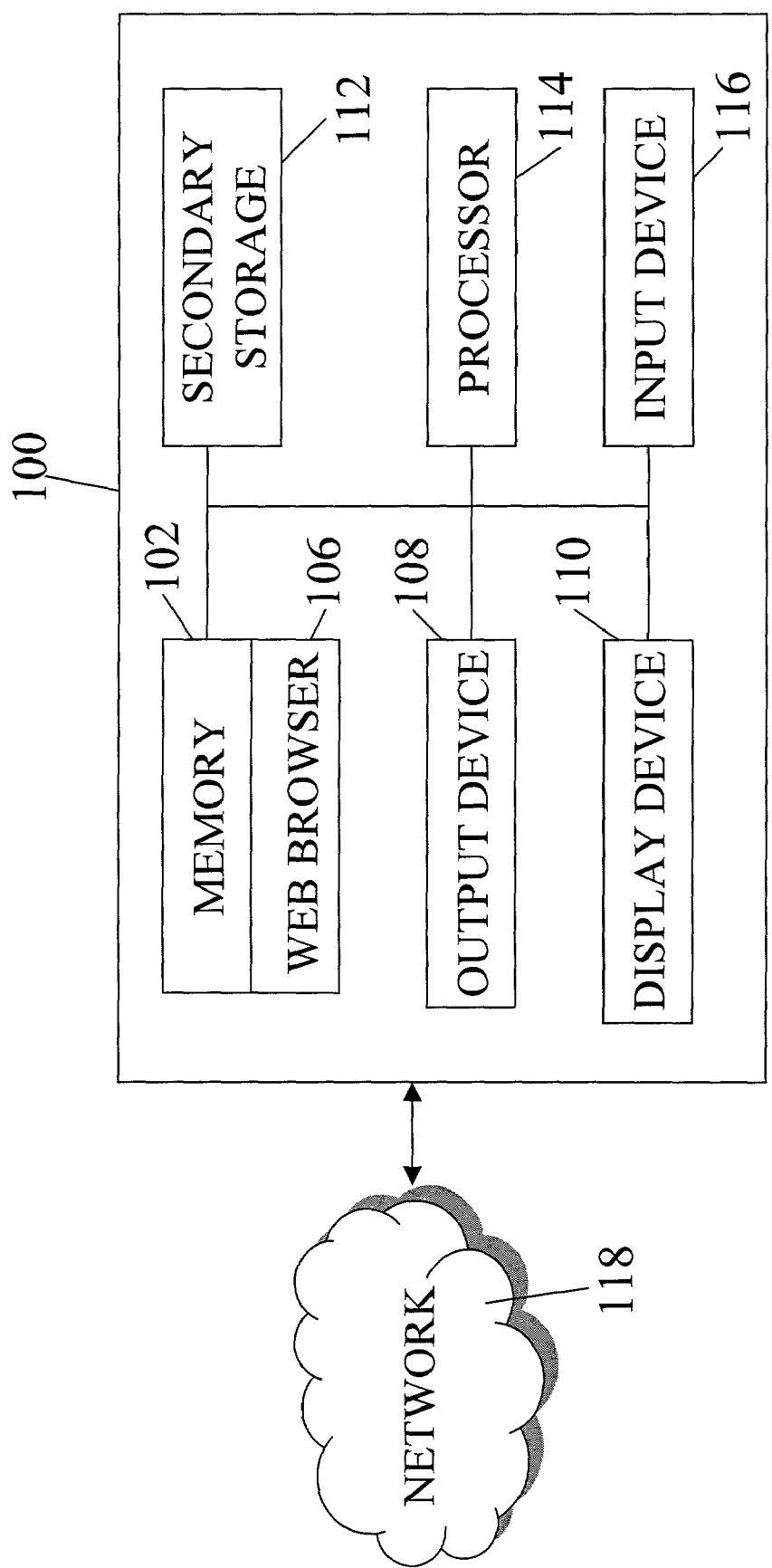
FIG. 1 illustrates exemplary hardware components of a computer that may be used in connection with an exemplary murmur for meetings.

FIG. 1 illustrates exemplary hardware components of a computer 100 that may be used to in connection with an exemplary murmur for meetings. The computer 100 includes a connection with a network 118, such as the Internet or other type of computer or phone networks, to establish a computer network system (not shown). The computer 100 typically includes a memory 102, a secondary storage device 112, a processor 114, an input device 116, a display device 110, and an output device 108.

The memory 102 may include random access memory (RAM) or similar types of memory. The memory 102 may be connected to the network 118 by a web browser 106. The web browser 106 makes a connection by way of the world wide web (WWW) to other computers, and receives information from the other computers that is displayed on the computer 100. The secondary storage device 112 may include a hard disk drive, floppy disk drive, CD-ROM drive, or other types of non-volatile data storage, and it may correspond with various databases or other resources. The processor 114 may execute applications or other information stored in the memory 102, the secondary storage 112, or received from the Internet or other network 118. The input device 116 may include any device for entering data into the computer 100, such as a keyboard, key pad, cursor-control device, touch-screen (possibly with a stylus), or microphone. The display device 110 may include any type of device for presenting visual image, such as, for example, a computer monitor, flat-screen display, or display panel. The output device 108 may include any type of device for presenting data in hard copy format, such as a printer, and other types of output devices include speakers or any device for providing data in audio form. The computer 100 can possibly include multiple input devices, output devices, and display devices.

Although the computer 100 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 100 to perform a particular method.

Each remote meeting participant may have access to a computer 100 that displays multiple murmur frames representing other participants in the meeting. The murmur frames may enable the participants from different locations to participate in a meeting as if they are physically present in the meeting by allowing the participants to be expressive as individuals. The murmur frames use manageable storage size with small files to generate clear and simple pictures. In other words, the murmur frames use more signs or icons than illustrations.

The murmur frames may be used with or without live videos of participants. For most purposes, using murmur frames alone or in addition to video may be more useful than using video alone, especially for teams trying to improve the dynamics and effectiveness of meetings, because the murmur's text banners, pictorial and audible frames provide a degree of clarity, consistency, and nuance that tends to be compromised in video transmission of facial expressions, stance, and gesture for communicating unspoken messages.

The display devices 110 of the computers 100 used to implement the exemplary murmur for a remote meeting may show a murmur frame for each participant in the meeting. Each participant may control his/her own murmur frame, which is typically visible to all other participants. The murmur frame may be labeled with the participant's name and may contain a still or video picture of the participant. If pictures are not available, only the participants' name appears in the participant's murmur frame. The framed pictures or names may be shown positioned in any meeting formation, such as around a conference table, in a "horseshoe" theater seating, or other formations, and the display of the murmur frames may be positioned anywhere on the user's display device 110.

Figure 2:
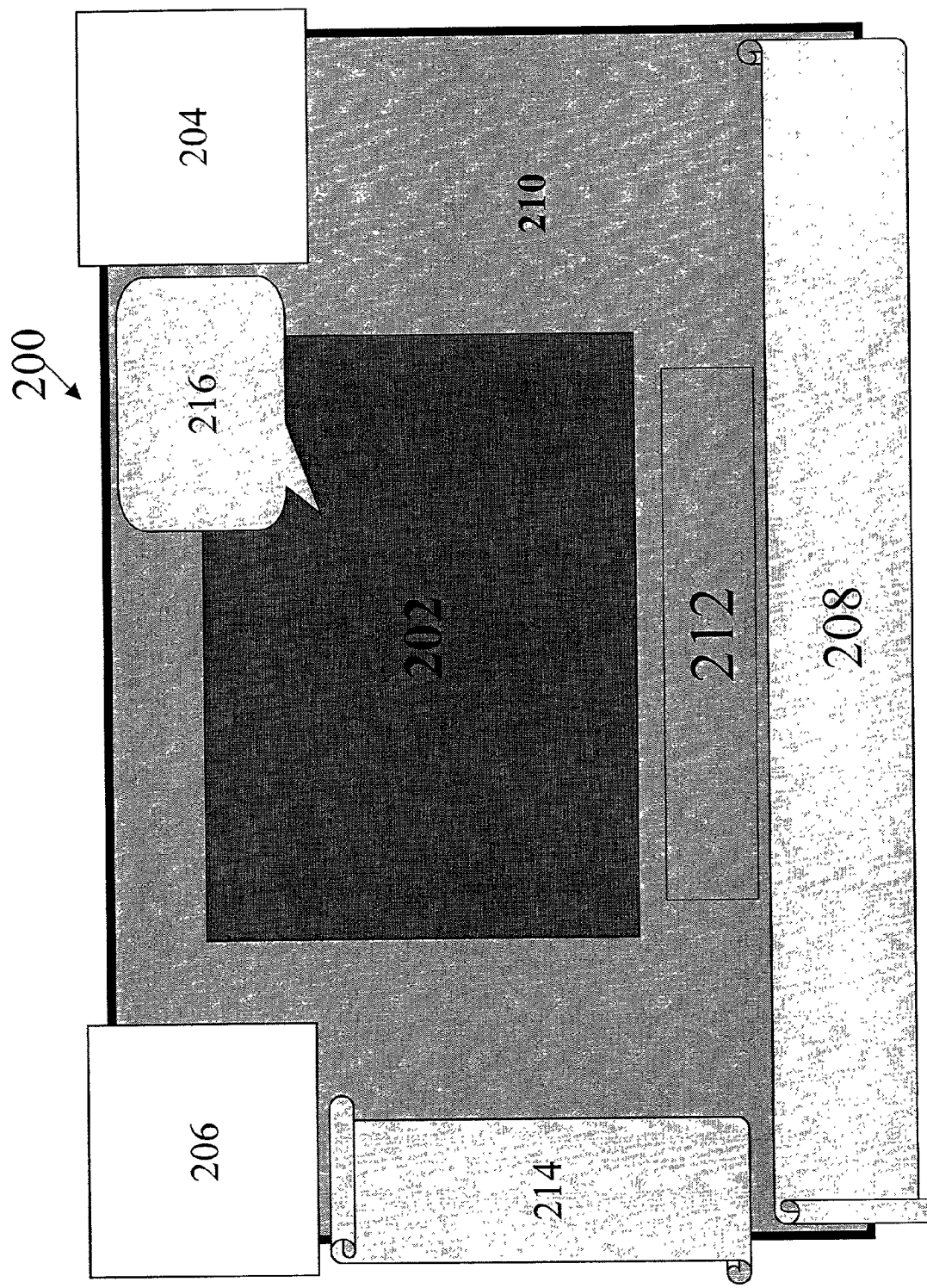
FIG. 2 illustrates an exemplary murmur frame for implementing the exemplary murmur of FIG. 1.

FIG. 2 illustrates an exemplary murmur frame 200 for implementing the exemplary murmur. The exemplary murmur frame 200 may be segmented and may contain a participant's name 212 and, if available, the participant's still or video picture 202. Background 210 of the exemplary murmur frame 200 may show the participant's frame of mind using, for example, different scenic pictures that are typically universally understood and work across cultures and countries. For example, a pleasant day background represents a pleasant, receptive mood, whereas a wintery picture indicates a cold, resistant mood. The exemplary murmur frame 200 may contain the participant's reactions 204 to the subject matter of discussion, for example, in an upper right corner. For example, displaying a cloud icon in the upper right corner 204 indicates that the participant has concerns about what is being discussed. The reaction to a subject matter under discussion may serve as an important peer-to-speaker communication, as well as peer-to-peer communication. The peer-to-peer communication is important because participants typically gauge the environment of a meeting and modify their interactions accordingly. For example, a participant may develop the courage to interrupt or raise a different point if he/she sees clouds show up on other participant's murmur frames 200. The exemplary murmur frame 200 may contain miscellaneous input 206 about the meeting, for example, in an upper left corner.

If the murmur frame is segmented with segments dedicated to specific aspects of the meeting as in the exemplary murmur frame 200, the choice of segment in which an icon is displayed may be significant. For example, by displaying a clock icon in the upper left corner 206, a participant may indicate that meeting time is running out, whereas by displaying a clock icon in the upper right corner 204, the participant may indicate that he or she feels that the current discussion has lasted too long, or that the time allotted for this specific topic is running out, although the meeting as a whole may not be close to ending.

Each participant may have a menu on his/her own computer 100 from which to select appropriate expressive frames in response to what happens during the meeting. Colored, animated versions of the murmur frames may be used if supported by the participants' computer platforms, while simpler versions of the same icons (for example, black and white instead of color, or still pictures instead of animations) may also be available for display on computers with limited displays, thus enabling the same murmur application to be used by a group whose members have a variety of different computer display capabilities.

A menu of the different choices for expressions may be available by clicking on a location in the murmur frame 200. For example, to display a menu of background 210, a participant simply clicks on the background section 210 on his/her murmur frame 200. Likewise, if the participant does not understand the meaning of some of the abbreviated signals or pictures, he/she may click on the icon on his/her display device 110 to display a list of the usual meanings of the available choices of signals or pictures. These usual meanings typically will not completely limit the possible usage of the signals since meaning in human communication is influenced by context. Also, the list of meanings and the available icons may be customizable so that user groups can add, modify, or delete icons, signals, and listed meanings.

In addition, the location of different participants' frames in relation to each other on any one participant's display may be rearranged by dragging an individual murmur frame 200 within the display device 110 of the computer 100. Participants may later be added to a meeting and their individual frames may be arranged side by side horizontally, vertically, or in other arrangements, depending on spaces available on a particular display device 110.

Some examples of signals or pictures used by the exemplary murmur frame 200 are provided in Table 1.

TABLE 1

| Murmur frames | Meaning |
| --- | --- |
| Frost and icicles | Chilly disapproval or lack or enthusiasm |
| Verdant, flourishing garden | Approval, agreement |
| Celebratory fireworks | Applause, enthusiasm, approval |
| Smoldering embers | Annoyance, beginning to take offense |
| Smoke and flames | Anger, strong disagreement |
| Thick fog drifting across and obscuring the picture/name | Confusion, lack of clarity |
| Many question marks | Wants to ask a question |
| Bar across participant's picture/name | Called away, returning shortly; may have type-in field for estimated return time |
| Many ears | Listening intently |
| Sunshine and clear sky | Agreement with what is said |
| Sun and fluffy clouds | General agreement, but some questions or concerns |
| Cloudy sky | Definite concerns, agreement withheld |
| Rain, storm, lighting | Bad news, disagreement |
| Clocks | Suggestion to watch the time |
| Coffee cup | Suggests taking a break |
| Night sky with moon and stars | Getting late, time to wrap up |

Additionally, the participant may insert annotations, such as brief comments or questions, within the murmur frame 200. For example, referring to FIG. 2, annotations may be inserted by the participant in a lower comment or question banner 208. Similarly, simple text, such as "???", which stands for questions, may be inserted by the participant in a left comment or question banner 214. The annotations may be relatively long or as short as "Yes!" or "No way!". The annotations may serve the same purposes as muttered comments serve in face-to-face meetings, i.e., allowing participants to interject comments or questions in "asides" without formally interrupting the speaker and taking the floor.

Besides the fields for annotations, the murmur may include configurable predefined standard annotations, i.e., default annotations, that may be selected from a drop-down menu. A team of participants may discuss, select, modify, add to, and agree on the definitions and uses for the predefined annotations for their team. The predefined annotations may be especially useful for cross-cultural teams that often face difficulties in communication. For example, one person's phrase for routine disagreement may be "That might be so," while another's may be "That's crazy!", and the difference in the different ways of expressing the same intention (routine disagreement) can cause misunderstandings. The default annotations may provide a common defined set of signals that all team members understand. Some examples of the predefined annotations are shown in Table 2.

TABLE 2

I have some concerns
Time constraints - how shall we pursue this?
Excellent work!
I need clarification before we move on
I have a question
I have an idea
I have a suggestion
I'd like to comment on this topic
I'd like to introduce a new topic
I volunteer for that
I disagree
I agree Referring to FIG. 2, a callout box 216 for status comments may be inserted by the participant to indicate the participant's status in the meeting. For example, Away indicates the participant is away from the meeting for an unspecified length of time and will not hear what takes place until returning, Break? suggests taking a break, BRB indicates be right back (away but intends to return promptly), and AFK indicates away from keyboard.

The exemplary murmur may support multiple participants at multiple sites, wherein the murmur frames 200 represent individual participants. However, if a meeting involves, for example, thousands of people, individual murmur frames 200 may need to represent different sites only. For example, one murmur frame 200 may be used to represent one site with multiple participants, i.e., representing the multiple participants singularly, in which case the participant who controls the computer at that site will be responsible for selecting icons that reflect the reactions of the group at that site as a whole. A big screen display device 110 may be used at each site. Alternatively, the display device 110 may show the speaker in the middle section, with small murmur frames 200 representing the sites displayed at the top or bottom. Clicking on an individual site murmur frame 200 enlarges and reveals magnified details of the site murmur frame 200. The individual site murmur frame 200 may be clicked again to return to the original size. For example, a participant or a site that notices a drastic change of background color in one of the murmur frames 200 may click on the murmur frame 200 to ascertain the detail of the change. Thereafter, the participant or the site may return attention to the speaker by shrinking the site murmur frame 200 to the original size. Similarly, the participant may magnify individual murmur frames 200 to read written annotations. Additionally, a participant or site may activate an optional feature to automatically enlarge any murmur frame 200 for a selectable number of seconds whenever the frame's icons or signals are changed.

In a face-to-face meeting, participants' laughter at a joke typically fades to a smile, then to a look of polite attention, and is typically replaced by other expressions. Similarly, the exemplary murmur frame 200 may have a default "fade rate." The participant may configure the default "fade rate" according to his/her preference, and may also override the default "fade rate" for a particular situation. For example, clicking to choose "applause" may trigger a brief burst of fireworks, which typically fades in a few seconds. However, the fireworks may be deliberately renewed or prolonged by the participant. The same may be true of other expressive frames and annotations. The default "fade rate" for annotations may be configured separately from other segments of each murmur frame 200. Other expressions may stay in place until changed or removed by the participant. Background pictures, for example, may typically stay in place until changed by the participant.

In addition, one or more audio frames may be included, either with or in place of the icons. For example, a sound of applause may be included accompanying or replacing an icon of fireworks display, whereas a "beep beep" sound of a car honking may be used instead of a clock icon. The audio frames may be used in connection with an audio output device 108 of the computer 100.

The exemplary murmur frames 200 may take advantage of color whenever color display devices 110 are available. Color is eye-catching, and enables participants to receive and interpret murmur information more effectively. For example, even if fifty murmur frames 200 appear on a display device 110, human eyes may readily recognize drastic color changes, for example, from green of agreement to disapproving white icicles. Color coding may be standard. For example, green indicates agreement, red signals hostility, and white represents iciness. Color coding particularly benefits a speaker. For example, a murmur frame 200 may appear across the top or bottom of a presentation slide on a speaker's computer screen. Facing the murmur frames 200 with multiple participants, the speaker may acknowledge an overall change of color from corners of his/her eyes, thus receiving feedback without having to study each murmur frame 200.

The exemplary murmur frames 200 may standardize the use of different sections of the murmur frame 200 by assigning specific meanings to various regions of the murmur frames 200. However, a participant may personalize the murmur frame 200 by choosing different sets of pictures that fit a convention, similar to choosing Windows background themes. For example, icicles may be pictured in the manner of a medieval manuscript or a Dutch master or a '60s cartoonist. Similarly, ears may be all human ears or drawn from an entire menagerie of listening animals. Likewise, fireworks may be sparklers and Roman candles or a Chinese New Year's parade with firecrackers and a parading dragon. Enabling participants to use various coordinated sets of graphics may help people recognize each other's contributions at a glance, and help to personalize or humanize the tool. However, the sets of pictures may need to follow the standards for color and placement.

The size, shape, color, and style of the murmur frame 200 and the line around the outside of the murmur frame 200 may be used to convey expression. For example, the murmur frame 200 itself may increase or decrease in size to show a participant's degree of involvement in or withdrawal from the meeting; the outer rim of the murmur frame 200 may sprout sharp spikes which may extend to convey hostility, or sprout flowers or money to express approval. The murmur frame's shape may twist to show confusion. In addition, the murmur frame 200 itself may be in the shape of a human figure, possibly in silhouette, and shift to assume different stances, such as bending down to express dejection, leaping up with upraised arms to express enthusiasm, or posing hand-to-ear gesture to express attentive listening.

Figure 3:
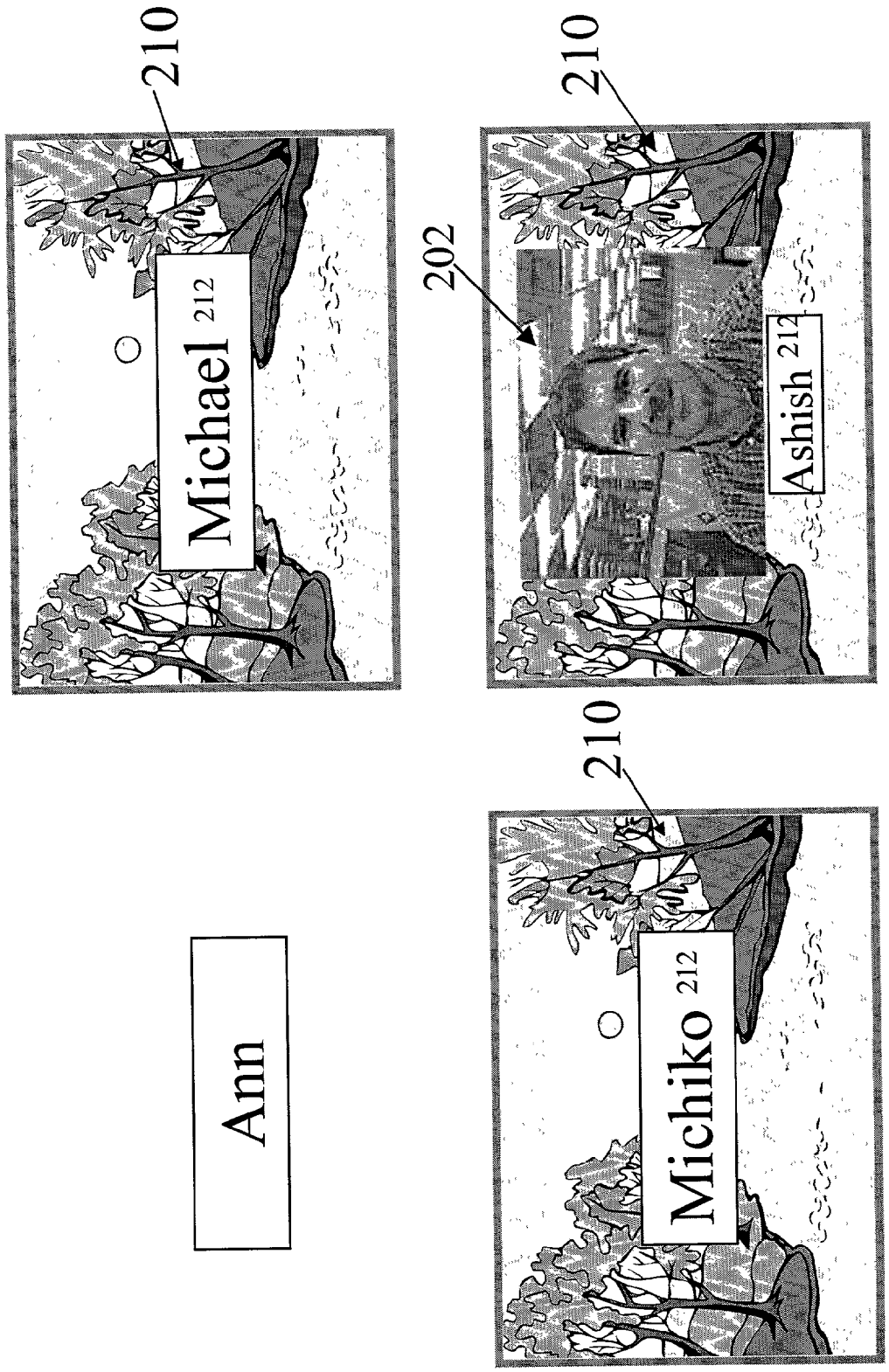
Figure 4:
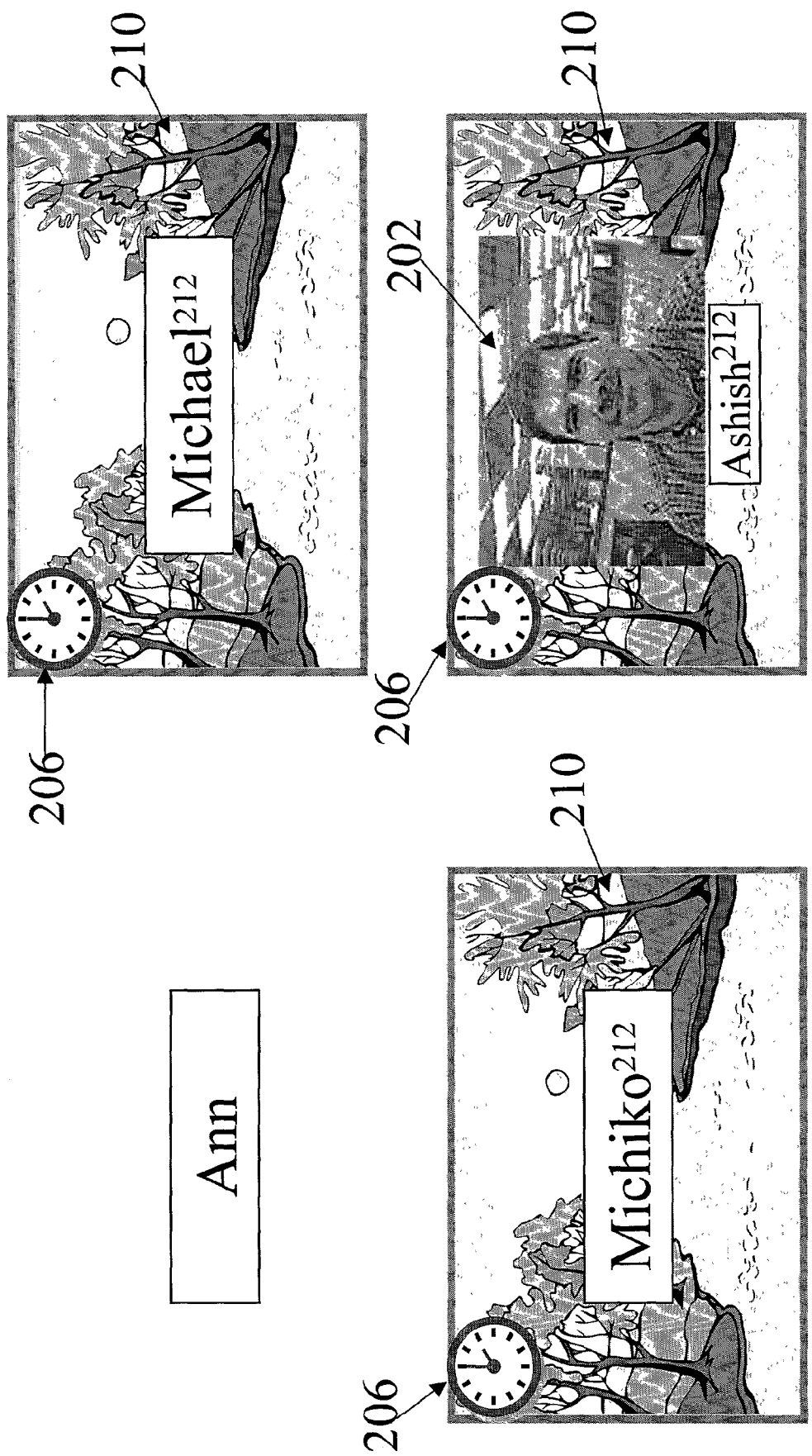

FIGS. 3–14 illustrate an exemplary meeting using the exemplary murmur and the exemplary murmur frame 200 of FIG. 2. Referring to FIG. 3, the murmur frame 200 shows all four participants' names 212 and Ashish's picture 202. Ashish is a leader of the meeting in this example. Ann is absent in FIG. 3. Michael, Michiko, and Ashish display pleasant backgrounds 210 in the murmur frames 200, indicating they are in good spirits. In FIG. 4, all three present participants show clocks in the upper left corners 206 of the murmur frames 200, indicating that meeting should be started despite Ann's absence.

Figure 6:
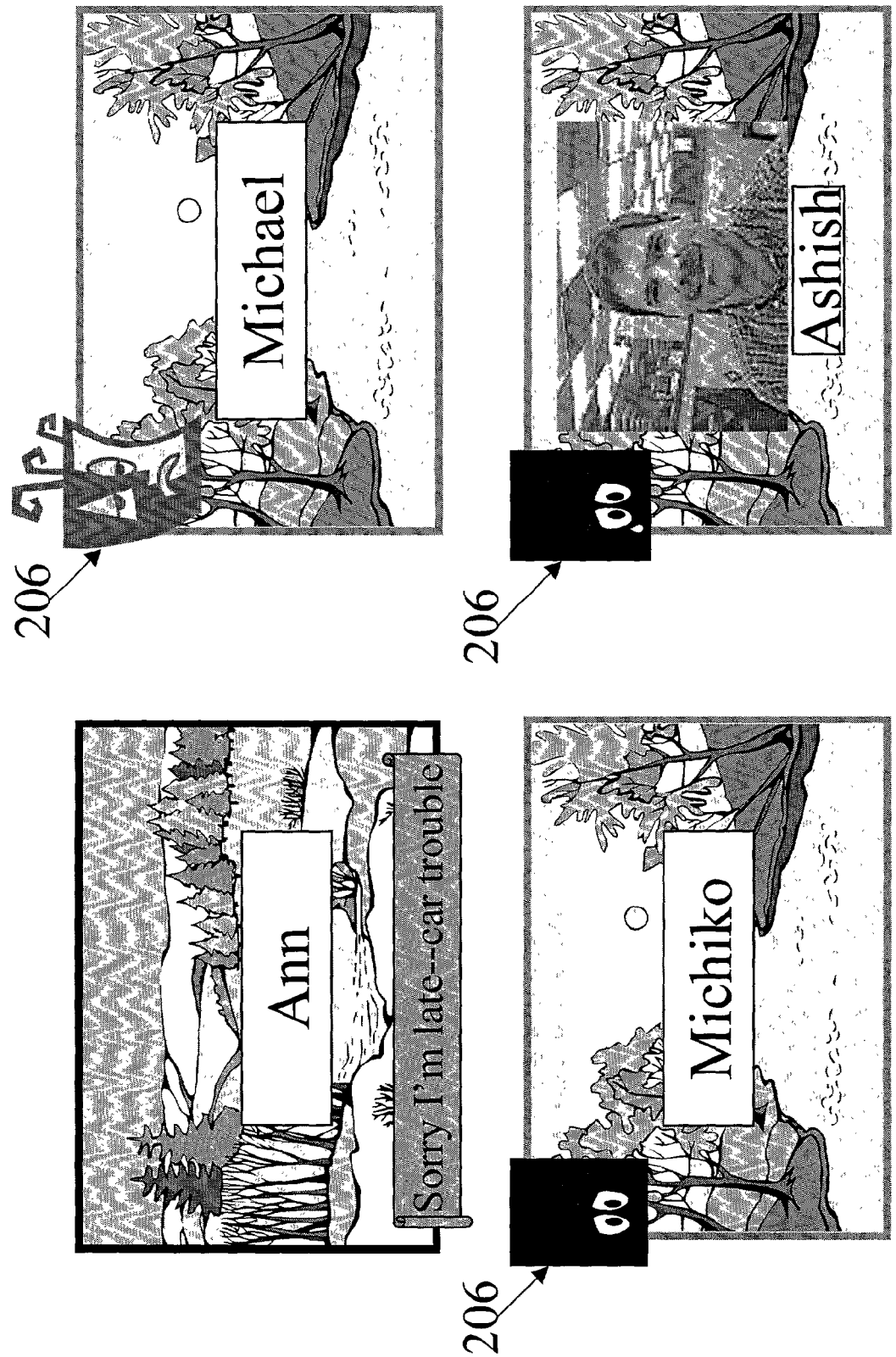

Ann shows up in FIG. 5, inserting a brief note 208 explaining "car trouble." She uses a wintery picture as her background 210, indicating she is not in a good mood. In FIG. 6, without interrupting the meeting, participants may show their sympathetic or distressed reactions 206 to Ann's trouble. An individual participant may customize icon styles within standard guidelines, allowing the participants to show their taste while conveying similar reactions. For example, as illustrated in FIG. 6, the style of the customized icon Michael displayed is different from the standard icons displayed by Michiko and Ashish. The location of the reaction icon is significant. For example, if Michael's distressed reaction were shown in the upper right corner 204, the reaction would indicate distress concerning the subject matter of discussion rather than a reaction to something other than the discussion, in this case, Ann's experience.

Figure 7:
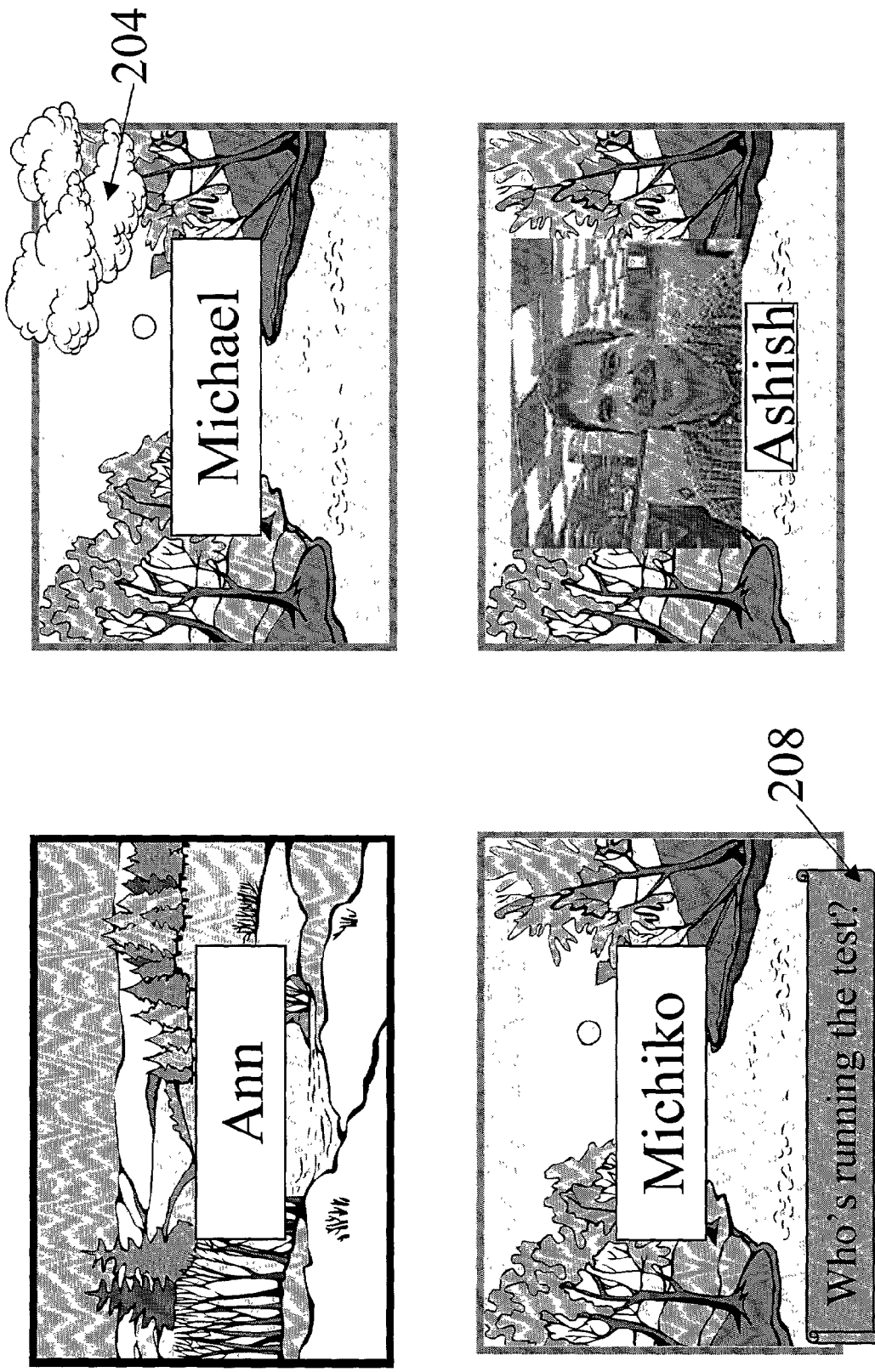
Figure 8:
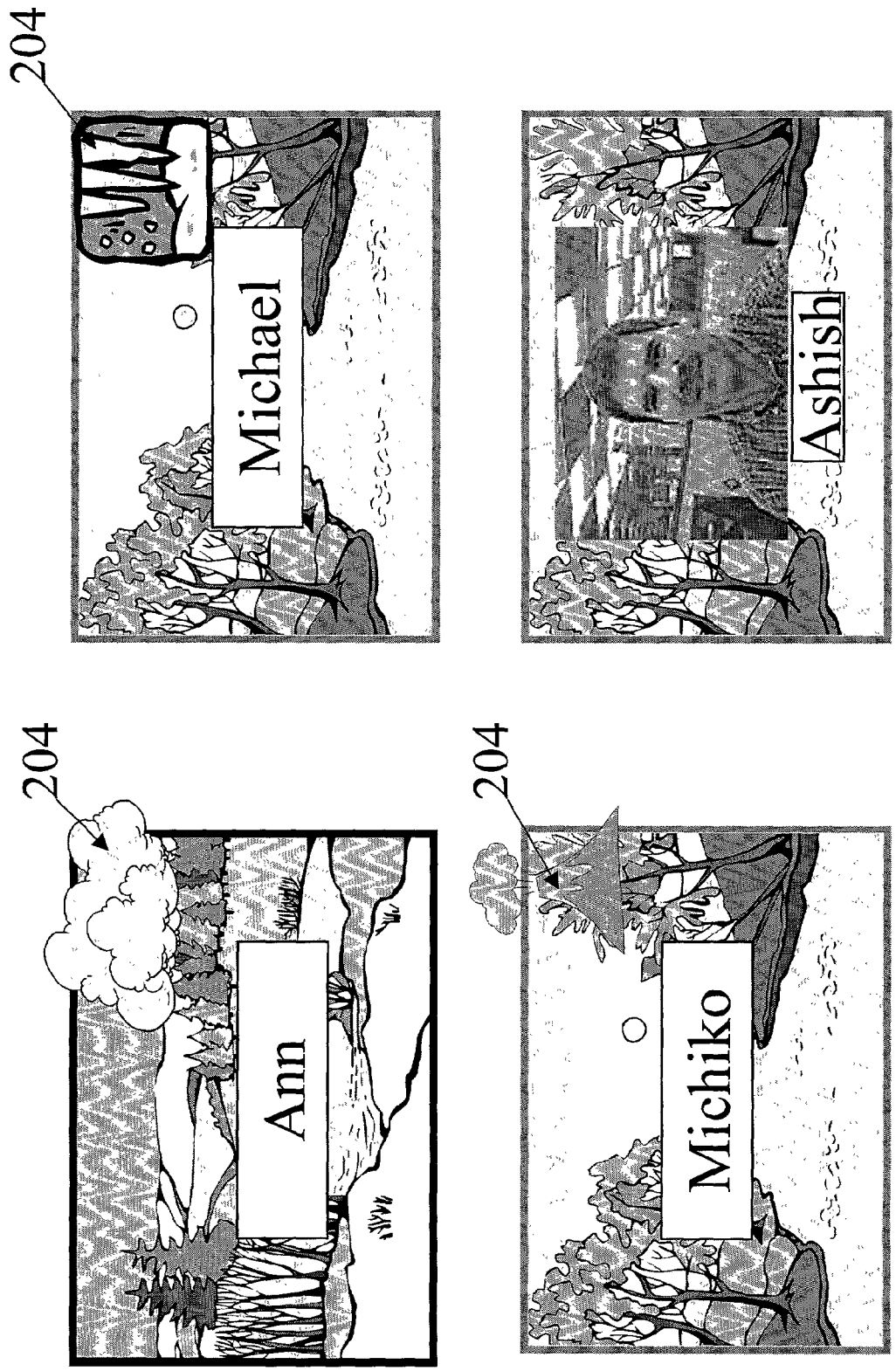

Referring to FIG. 7, after Ashish makes an unpleasant announcement, Michael raises clouds in the upper right corner 204 of his murmur frame 200, and Michiko asks a question in the lower comment banner 208: "who's running the test." In FIG. 8, Ann indicates that she does not like what she is hearing by raising clouds in the upper right corner 204 of her murmur frame 200. At the same time, Michael's attitude towards the subject matter turns to freezing 204 and Michiko displays a volcano 204 ready to erupt. However, Michael and Michiko's background scenes 210 have not changed, indicating that, even though they disagree with Ashish, the subject matter of the discussion has not impacted their spirits.

Figure 9:
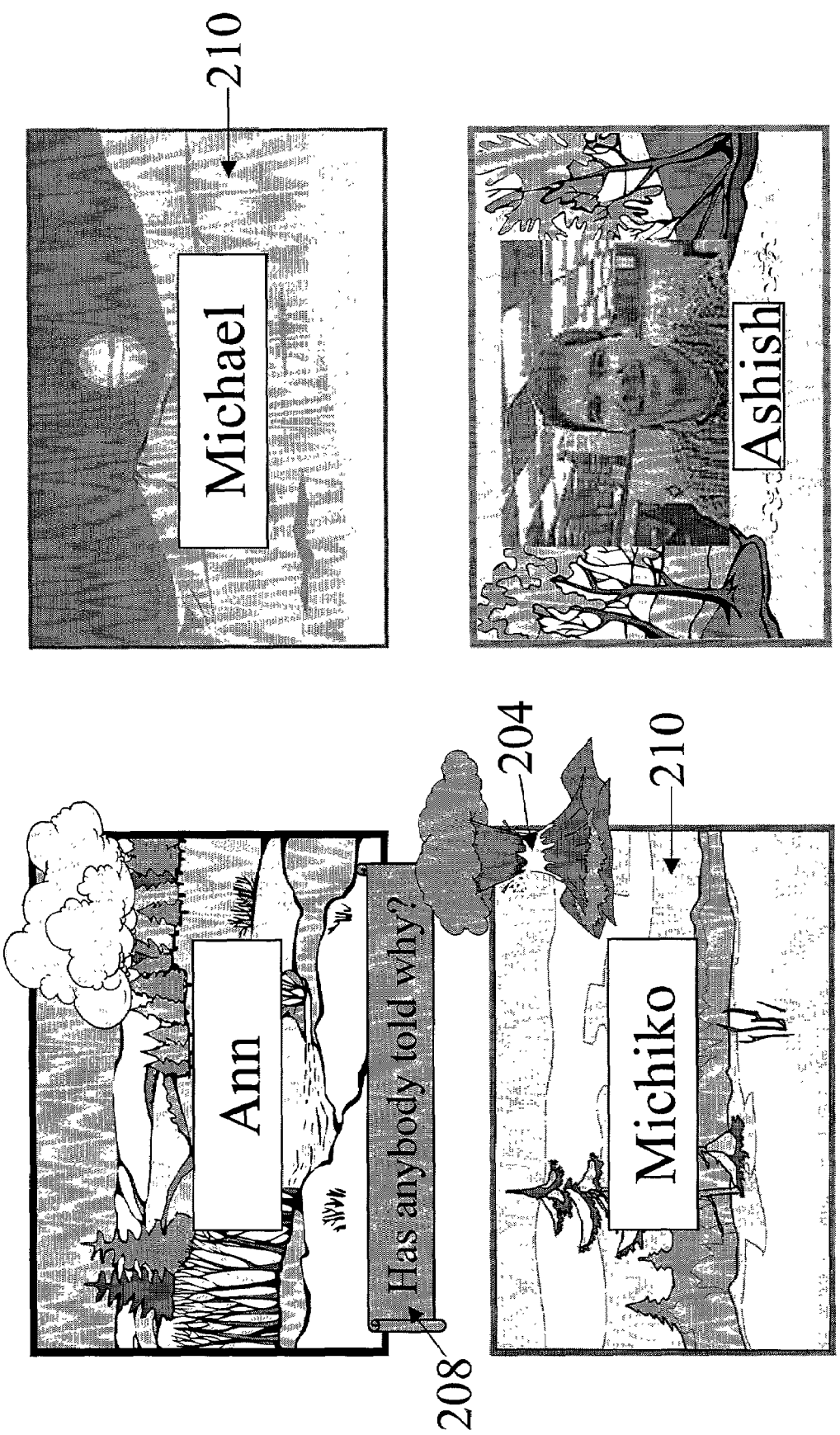

In FIG. 9, however, Michael and Michiko's dispositions change for the worse. Michael changes his background 210 to a snow field by moonlight, while Michiko causes the volcano in the upper right corner 204 to erupt over a wintery background 210. Both Michael and Michiko are upset because of what is discussed. Michael steps away in FIG. 10, raising a "BRB" sign in the middle section 216 of his murmur frame 200 to indicate that he expects to be gone only briefly and will Be Right Back. In FIG. 11, Ashish seems to have gradually persuaded the colleagues. Ann raises a sun-over-cloud picture in the upper right corner 204, indicating that long term benefit may exist. Michael is back and removes the "BRB" sign.

Figure 12:
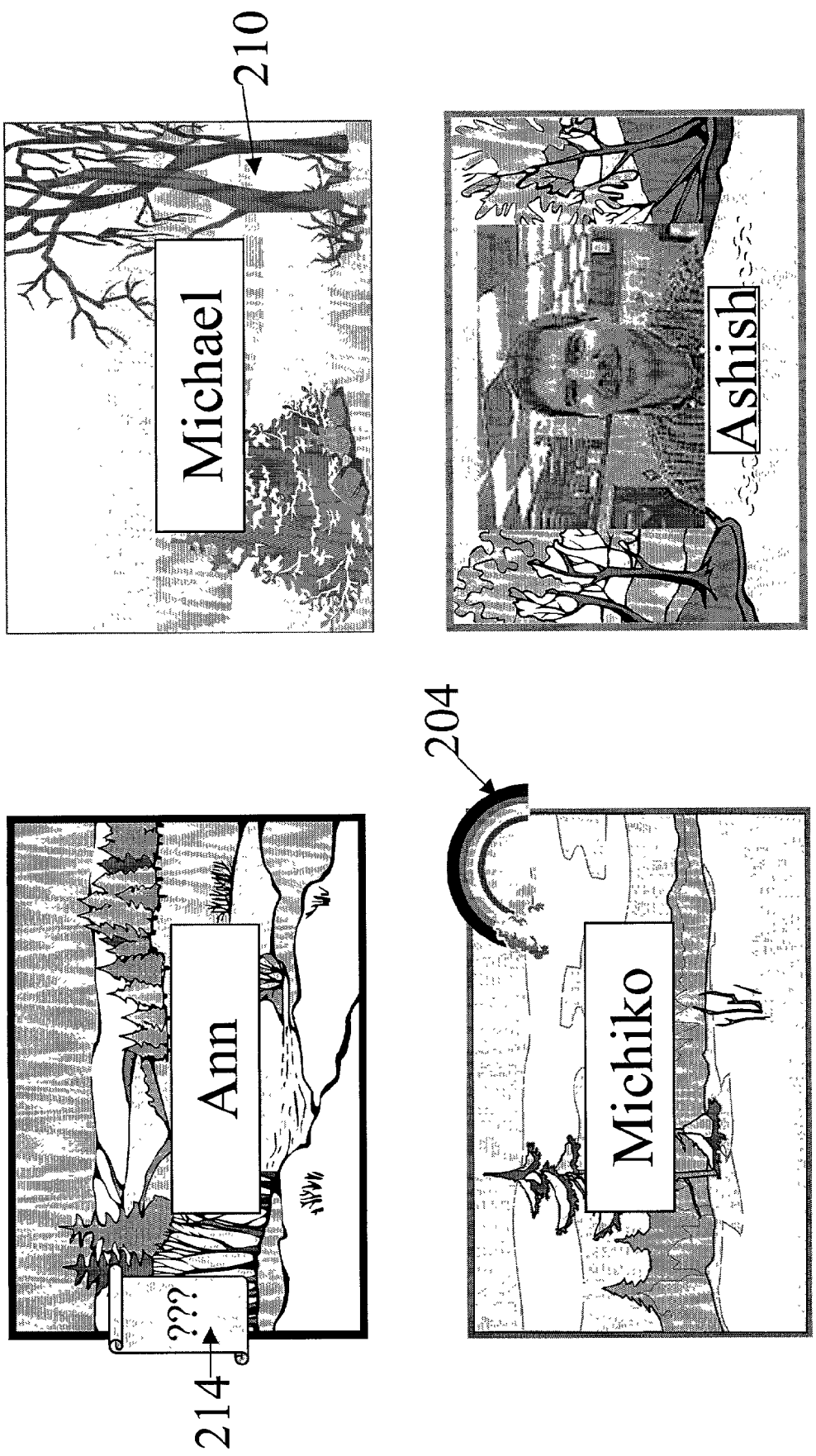
Figure 13:
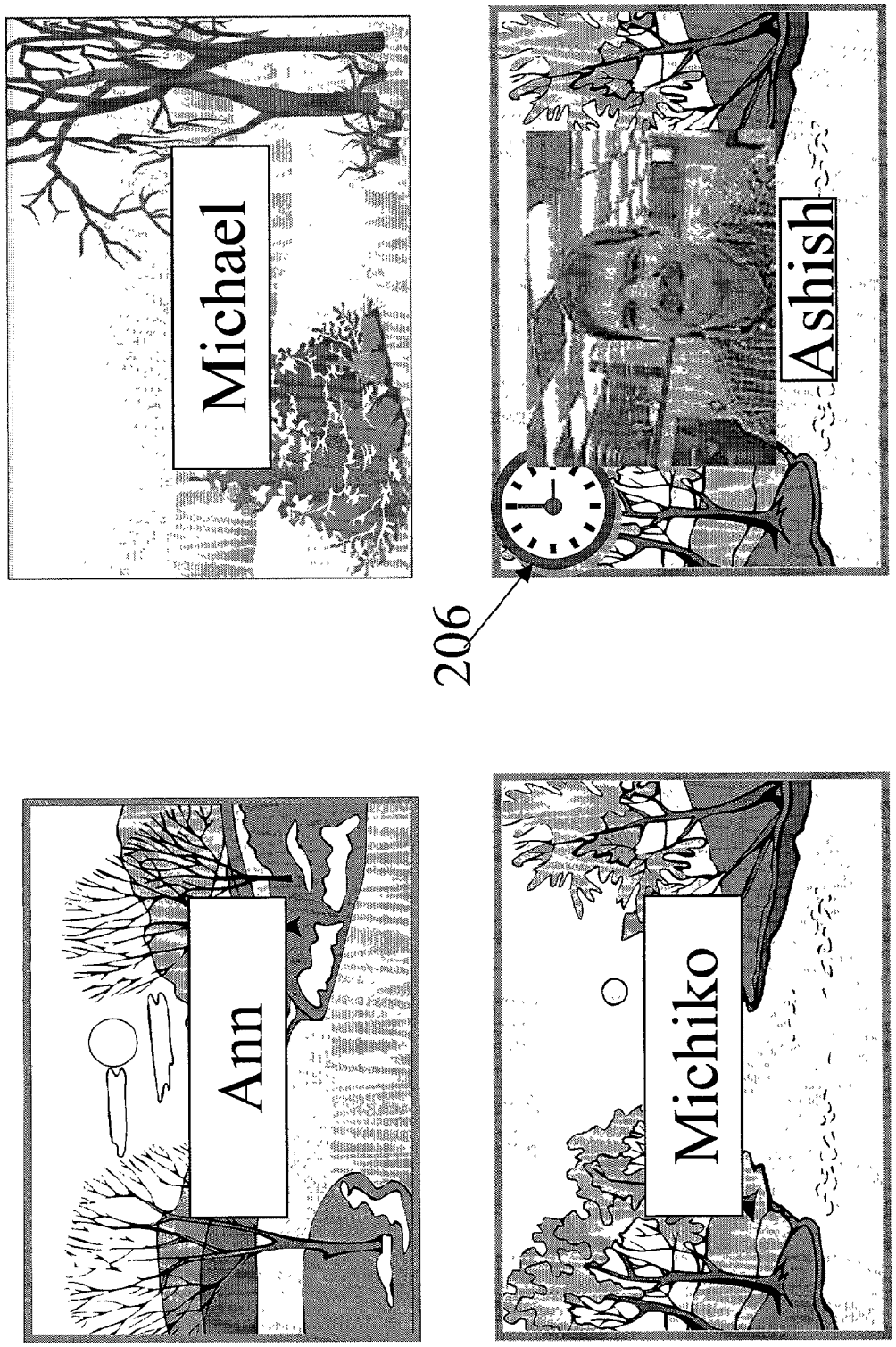
Figure 14:
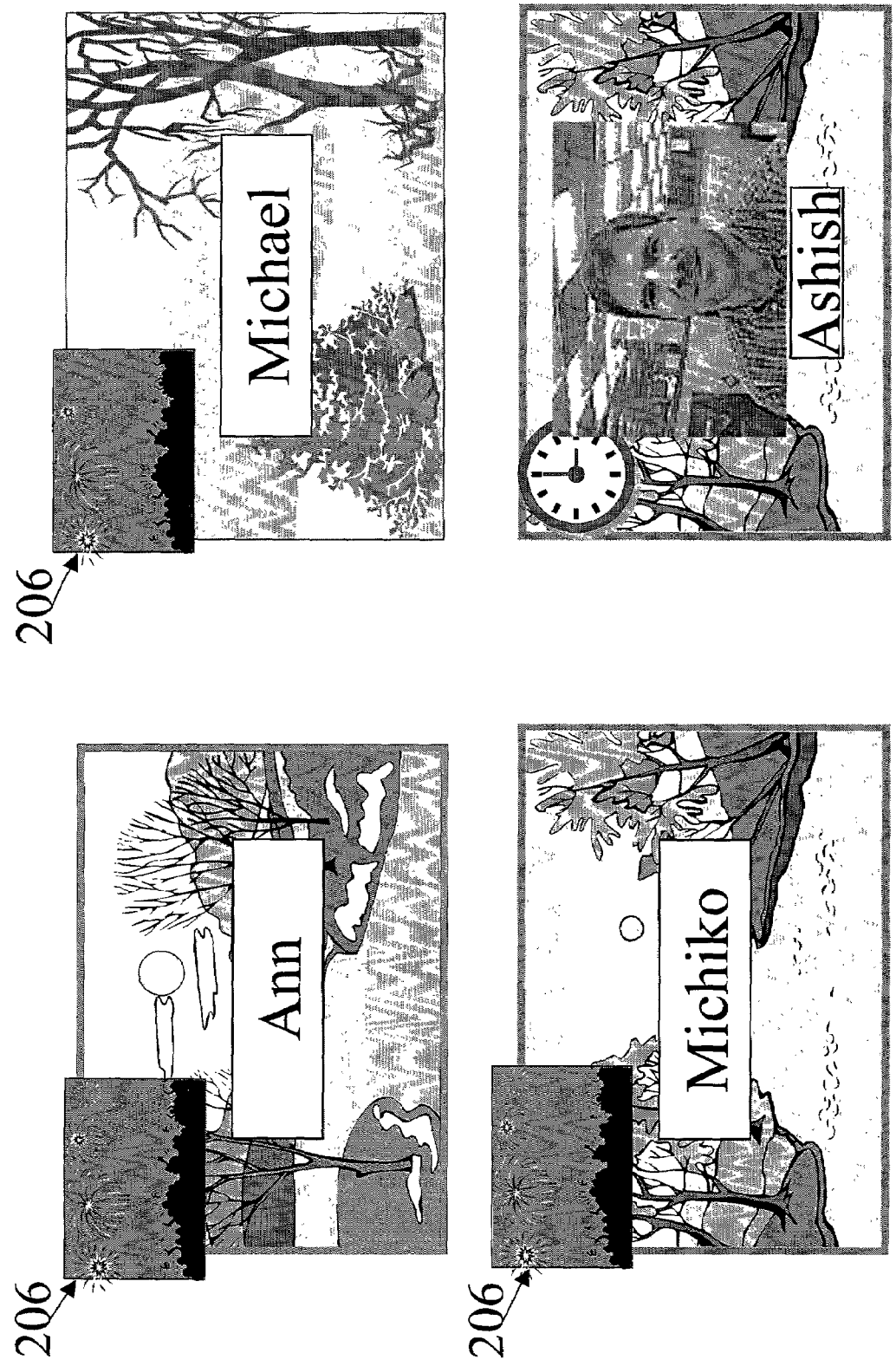

In FIG. 12, Ann raises "???" question marks in the left comment banner 214 of her murmur frame 200, signaling that she needs more explanation. Michael shines light on his moonlight background 210, showing a mood improvement. Michiko also raises rainbow in the upper right corner 204 of his murmur frame 200, starting to agree with the subject discussed. Referring to FIG. 13, both Ann and Michiko change their moods by displaying more pleasant backgrounds 210. Ashish raises a clock in the upper left corner 206, indicating that he needs to wrap up the meeting. In FIG. 14, all there participants, Ann, Michael, and Michiko, approve the meeting by displaying fireworks in the upper left corners 206 of the murmur frames 200. The fireworks typically fad away after a few seconds.

While the frame for communicating expressive information for meetings has been described in connection with an exemplary embodiment, those skilled in the art will understand that many modifications in light of these teachings are possible, and this application is intended to cover any variations thereof.

What is claimed is:

1. A frame for one or more participants to communicate expressive information with other participants in a meeting, the frame comprising:
    sub-areas each dedicated to a specific aspect of the meeting, wherein the sub-areas are not distinct frames within a larger frame, and wherein displaying an icon in a first sub-area conveys a different expressive information from displaying the icon in a second sub-area, and
    wherein the frame containing the expressive information is transmitted to the other participants through a computer network system to advance communication for the meeting.

2. The frame of claim 1, wherein the frame singularly represents multiple participants at one of multiple sites.

3. The frame of claim 1, wherein the frame further comprises:

a personal information section, wherein the personal information section contains a name and a still or video picture of the participants;
    one or more icons, indicating inputs and reactions of the participant related to a subject matter or other aspects of the meeting, wherein the inputs include pictorial and textual inputs; and
    one or more annotation banners containing comments or questions of the participant.

4. The frame of claim 3, wherein the inputs further include audible input.

5. The frame of claim 3, further comprising a callout box for status comments.

6. The frame of claim 3, wherein the one or more icons have a default fade rate.

7. The frame of claim 1, wherein the frame is color coded, and wherein different color represents different expressive information.

8. The frame of claim 1, wherein the frame and lines around the frame change in size, shape, color, and style to convey the expressive information.

9. The frame of claim 1, further comprising predefined standard annotations that can be selected from a menu, wherein the predefined standard annotations are configurable.

10. A computer network system for communicating expressive information for meetings, the computer network system comprising:
    a plurality of computers that include display devices and audio output devices;
    a plurality of frames positioned on the display devices, wherein each frame comprises: sub-areas each dedicated to a specific aspect of the meeting, wherein the sub-areas are not distinct frames within a larger frame, and wherein displaying an icon in a first sub-area conveys a different expressive information from displaying the icon in a second sub-area; and
    a network that transmits the plurality of frames, whereby multiple participants can communicate the expressive information through the plurality of frames.

11. The computer network system of claim 10, wherein the inputs further include audible input.

12. The computer network system of claim 10, wherein each frame further comprises:
    a personal information section, wherein the personal information section contains a name of a participant;
    one or more icons, indicating inputs or reactions of the participant related to a subject matter or other aspects of the meeting, wherein the inputs include pictorial and textual input; and
    one or more annotation banners containing comments or questions of the participant,
    wherein the icon indicating reactions of the participant has a default fade rate.

13. The computer network system of claim 10, wherein the plurality of frames are color coded, and wherein different color represents different expressive information.

14. The computer network system of claim 10, wherein the plurality of frames and lines around the frames change in size, shape, color, and style to convey expression.

15. The computer network system of claim 10, wherein the plurality of the frames are listed on the display devices and can be selectively enlarged.

16. The computer network system of claim 10, wherein the plurality of frames can be personalized by the multiple participants.

17. The computer network system of claim 10, further comprising predefined standard annotations that can be selected from a menu, wherein the predefined standard annotations are configurable.

18. A computer readable medium providing instruction for communicating expressive information for meetings, the instructions comprising:

communicating personal information that includes names of multiple participants through frames;

subdividing each frame into sub-areas, wherein each sub-area is dedicated to a specific aspect of a meeting, wherein the sub-areas are not distinct frames within a larger frame, and wherein displaying an icon in a first sub-area conveys a different expressive information from displaying the icon in a second sub-area;

communicating inputs and reactions of the multiple participants to a subject matter and other aspects of the meeting through the frames;

communicating comments or questions of the multiple participants in one or more annotation banners through the frames; and communicating miscellaneous input from the multiple participants through the frames.

19. The computer readable medium of claim 18, further comprising instructions for communicating personal information that includes still or video pictures of the multiple participants through the frames.

* * * * *